UNITED STATES PATENT OFFICE.

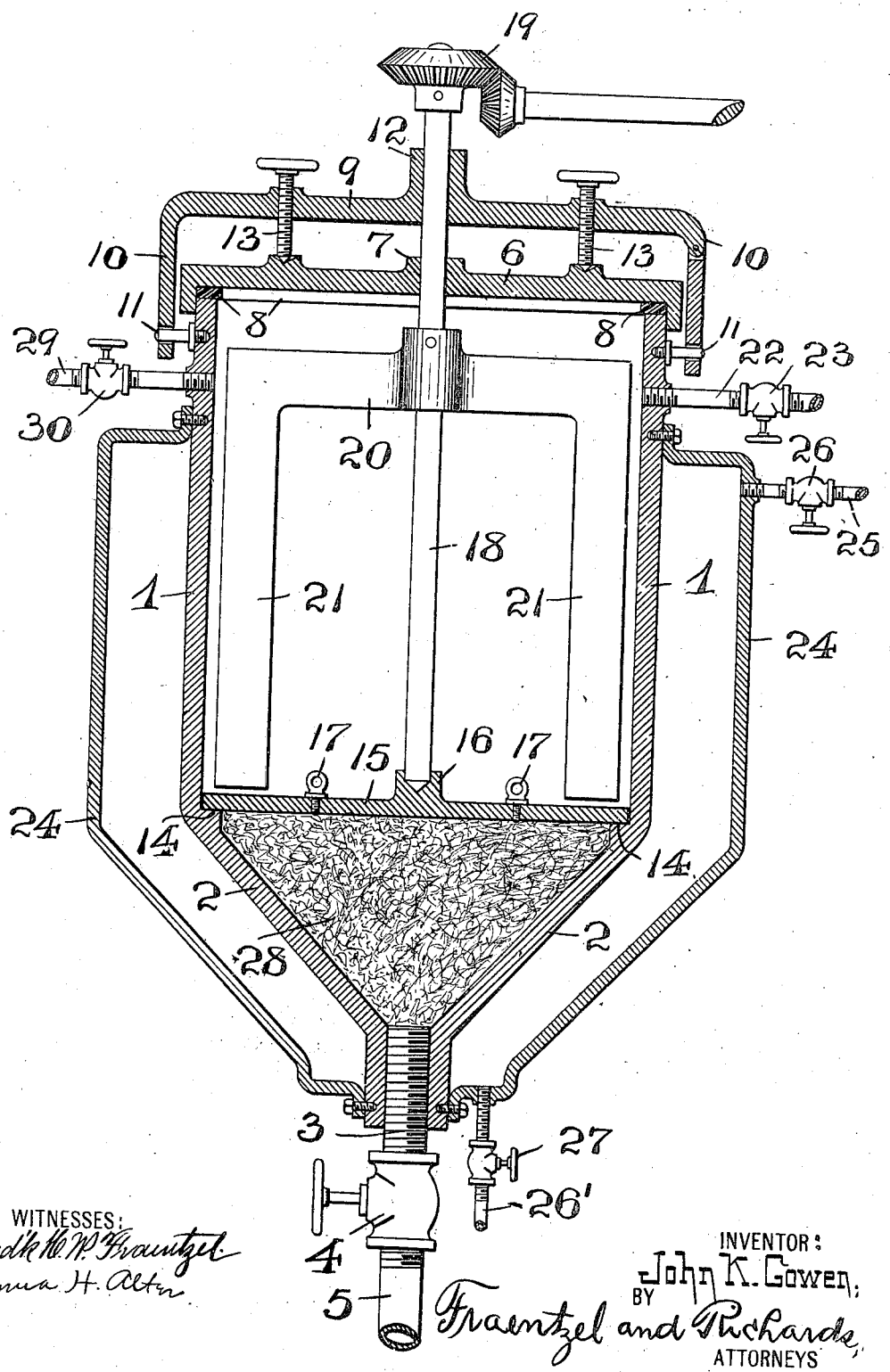

JOHN K. GOWEN, OF NEWARK, NEW JERSEY.

PROCESS OF MAKING VANILLA EXTRACT.

1,010,043.

Specification of Letters Patent. Patented Nov. 28, 1911.

Application filed March 16, 1910. Serial No. 549,716.

*To all whom it may concern:*

Be it known that I, JOHN K. GOWEN, a citizen of the United States, residing at Newark, in the county of Essex and State of New Jersey, have invented certain new and useful Improvements in Processes of Making Vanilla Extract; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to a novel process or method of digesting vegetable matter, and especially vanilla beans; tonka beans, roots, herbs, barks, spices, and the like; and, the invention has for its principal object to provide a novel, simple and very efficient method or process of producing alcoholic extractions or tinctures of vegetable matter in the manner hereinafter more particularly set forth.

With these objects in view, the invention consists, primarily, in the novel method or process of mechanically and chemically digesting vegetable matter, such as vanilla beans, tonka beans, roots, herbs, barks, spices, and the like.

In connection with the method or process to be hereinafter more particularly set forth, I prefer to employ an apparatus of the general arrangement and combination of devices and parts represented in the accompanying drawing, although it will be clearly evident that any other convenient apparatus suitable for the purposes of the present invention may be employed.

Referring now more particularly to the accompanying drawing, in which is shown a vertical section of one form of apparatus suitable for the purposes of this invention, the reference-character 1 indicates a suitable container, which may be of any suitable size and configuration, the lower portion of the body of said container being preferably made with a cone-shaped portion 2, which is formed with a suitable outlet, as 3. The said outlet or nozzle thus formed is provided with a suitably constructed shut-off, as 4, in the form of a valve or gate, with which is connected a suitable outlet pipe or duct 5. Resting upon the upper portion of said container or main body 1 is a suitably formed cover, as 6, which is provided with a bearing 7 of any suitable construction. The said cover or plate 6 is secured down upon a packing or gasket 8, resting upon the marginal edge of the container or body 1, by means of a fastening device, preferably in the form of a yoke 9, the downwardly depending end-portions 10 of which are detachably connected with studs or projections, as 11, or other suitable holding means extending from opposite sides of the said container or body 1. The said yoke also has a bearing, as 12, in alinement with the bearing 7 of the cover 6, suitable screws or bolts, as 13, being employed, for securing the parts in their assembled relation, when the cover is to be tightly fastened down upon the said container or body 1. Resting loosely and removably upon an annular shoulder 14, or other supporting means, within said container or body 1. preferably in the lower part thereof, is a disk 15 which is provided with a socketed hub 16, forming a pedestal-bearing, and provided further with suitable lifting devices, as screw-eyes 17, when it is desired to remove the disk 15 from within said container or body 1. Rotatably and removably arranged in said bearings 7 and 12, and supported in the socketed hub 16, is a vertical shaft or spindle 18, which is provided upon its upper portion which extends above the yoke 9 with any suitably formed and well known driving means, as 19. Suitably mounted upon said shaft or spindle 18 is a cross-bar, as 20, with which are connected suitably formed agitators, as 21. Extending into the upper portion of said container or body 1 is a pipe or duct 22, provided with a valve 23, for forcing air or other medium, under pressure, into said container or body, when necessary. The reference-character 24 indicates a suitably formed water-jacket, suitably connected with and surrounding the greater portion of said container or body 1, said water-jacket usually being provided with an inlet-pipe 25, in which is a valve 26, and an outlet-pipe 26′ in which is a shut-off or valve 27.

In the lower chamber formed by the cone-shaped bottom of the container or body 1 and the disk 15 removably placed upon the support 14, is arranged a strainer-like medium 28, of excelsior, cotton, or other suitable material, through which the menstruum may percolate during the process as it passes on its way to the outlet 3.

Having in the above described one form of apparatus which may be used with my novel method or process of digesting vegetable matter, I will now briefly set forth the different steps in carrying out such method or process.

Having removed the cover or plate 6, and the vertical shaft and its agitator from within the container, the disk 15 is placed in position. Within the chamber thus provided is placed the vegetable matter for treatment by my novel method or process.

In carrying out my novel method or process I will describe the same more particularly in mechanically and chemically digesting vanilla beans, to produce an extract or tincture. The vanilla beans in the desired quantity and in the ripened and proper state are first broken up, by chopping, grinding, or other suitable means, into small pieces, usually about one-eighth inch in size, although the pieces of bean may under different circumstances be even smaller or larger than one-eighth inch. The broken or chopped pieces of bean are then placed in the upper chambered portion of the container or tank, sufficient water being added in which the bean is steeped for maceration, and the water having been heated to the proper degree, usually 165 degrees Fahrenheit, although this temperature may be varied, according to the kind and quality of bean, or other vegetable matter which is to be treated. The cover or plate 6, with the spindle or shaft 18 and its agitator, are then replaced in the manner shown in the drawing, the cover or plate 6 being tightly secured against displacement by means of the yoke 9 and the tightening screws 13. At the same time, the container or body 1 is kept hot by the admission of hot water or other heating medium into the space formed by the water-jacket, the temperature of the said heating medium, being such, as to maintain an even or uniform temperature of the mixture or contents within the container or body 1. During this time the said mixture or contents is subjected to agitation by the moving wings or blades 21, this agitation or stirring of the liquid or semi-liquid mixture continuing a sufficient length of time, from a few minutes to two or more hours, according to the kind and quality of bean, or other vegetable matter, which is being treated. After this treatment, agitation is arrested, and the mixture or contents of the body 1 is allowed to set, until the temperature is reduced to eighty degrees Fahrenheit, more or less. When the liquid or semi-liquid has thus been cooled to the required temperature, spirits (alcohol) in sufficient quantity is added, through a suitable pipe 29 in which there is a shut-off or valve 30, or in any suitable manner, it being understood that none of the water is drawn off. The quantity of alcohol and water usually used is 40 per cent. alcohol to 60 per cent. of water, although this proportion may be varied, if found desirable. The temperature of the alcohol, water and bean, (or other vegetable matter which is being treated,) is now raised, usually to 110 degrees Fahrenheit, or more or less, according to the material which is being treated, and the agitator is again set in operation. A gradual agitation of the menstruum is continued usually for three hours or such other period as may be found necessary according to the condition of the vanilla bean, or other vegetable matter which is being treated. The apparatus is now brought to rest, and the contents of the container or body allowed to cool until the temperature is down to normal, the mixture being allowed to rest for at least one hour, although under certain conditions it is well to allow the mixture to remain quiet for a longer period. The cap, cover, or plate 6, with the shaft and its agitator, are again removed, and the disk 15 is also taken from within the interior of the container or body 1. Thereupon the cap, cover or plate 6 is again secured in its closing position upon said container or tank 1, the valve 23 in the pipe 22 opened, and air under sufficient pressure admitted into the container or tank 1, so as to force the previously treated menstruum through the percolator or straining medium in the lower cone-shaped portion of the container or body 1, the menstruum finally flowing out of the pipe connected with the lower portion of the container, as an extract or tincture, as will be clearly understood.

It may be remarked that the ingredients used in my novel process or method may be used in the relative proportions as follows: vanilla beans, 7.5 parts to 60% water, and 40% alcohol, the strength of the latter being 95% proof.

While I have described my novel process or method in the production of an extract or tincture from the vanilla bean, the same method or process, as has been previously stated, may also be used in the production of extracts or tinctures from the tonka bean, and other vegetable matter, as roots, herbs, barks, spices, and the like.

Of course, it will be understood that any other suitably constructed apparatus adapted for the purposes of my present invention may be employed in lieu of the form of apparatus shown in the accompanying drawing.

I claim:

1. The herein described process of mechanically and chemically digesting vanilla beans, comprising macerating the beans in water heated to not more than 165 degrees Fahrenheit to produce such maceration, agitating such mixture, then allowing the mixture to stand and cooling the same to not less than 80 degrees Fahrenheit, thereupon adding alcohol and under pressure filtering the said mixture, substantially as set forth.

2. The herein described process of mechanically and chemically digesting vanilla beans comprising macerating the beans in water heated to not more than 165 degrees Fahrenheit to produce such maceration, agitating such mixture, then allowing the mixture to stand and cooling the same to not less than 80 degrees Fahrenheit, thereupon adding alcohol, gradually raising the temperature of the alcohol, water and the beans, gradually agitating the mixture, then cooling the same, and under pressure filtering the said mixture, substantially as and for the purposes set forth.

3. The herein described process of mechanically and chemically digesting vanilla beans comprising macerating the beans in water heated to not more than 165 degrees Fahrenheit to produce such maceration, agitating such mixture, then allowing the mixture to stand and cooling the same to not less than 80 degrees Fahrenheit, thereupon adding alcohol, gradually raising the temperature of the alcohol, water and the beans, gradually agitating the mixture, then cooling the same, and finally adding air under pressure and forcing the menstruum through a percolating medium from which it flows as an alcoholic extract or tincture, substantially as and for the purposes set forth.

In testimony, that I claim the invention set forth above I have hereunto set my hand this 14th day of March, 1910.

JOHN K. GOWEN.

Witnesses:
FREDK. C. FRAENTZEL,
FREDK. H. W. FRAENTZEL.